(12) United States Patent
Huang et al.

(10) Patent No.: US 11,030,736 B2
(45) Date of Patent: Jun. 8, 2021

(54) METHOD FOR APPLYING AUTOMATIC OPTICAL INSPECTION TO COPPER COILS THINNED BY LASER ETCHING AND APPARATUS THEREFOR

(71) Applicants: Meng-I Huang, Kaohsiung (TW); Hsueh-Yi Hsiung, Kaohsiung (TW); Po-Nien Su, Kaohsiung (TW)

(72) Inventors: Meng-I Huang, Kaohsiung (TW); Hsueh-Yi Hsiung, Kaohsiung (TW); Po-Nien Su, Kaohsiung (TW)

(73) Assignees: Laser Tek Taiwan Co., Ltd, Kaohsiung (TW); Meng-I Huang, Kaohsiung (TW); Hsueh-Yi Hsiung, Kaohsiung (TW); Po-Nien Su, Kaohsiung (TW)

( * ) Notice: Subject to any disclaimer, the term of this patent is extended or adjusted under 35 U.S.C. 154(b) by 45 days.

(21) Appl. No.: 16/705,264

(22) Filed: Dec. 6, 2019

(65) Prior Publication Data
US 2020/0111205 A1   Apr. 9, 2020

(51) Int. Cl.
*G06T 7/00* (2017.01)
*H01F 41/04* (2006.01)
*H02J 50/10* (2016.01)
*H04B 5/00* (2006.01)

(52) U.S. Cl.
CPC ......... *G06T 7/0004* (2013.01); *H01F 41/042* (2013.01); *H02J 50/10* (2016.02); *H04B 5/0037* (2013.01)

(58) Field of Classification Search
CPC .............................. G06T 7/0004; H02J 50/10
See application file for complete search history.

(56) References Cited

U.S. PATENT DOCUMENTS

2016/0184932 A1* 6/2016 Wu ..................... B23K 26/0846
                                                                219/121.72
2018/0019050 A1* 1/2018 Min ...................... H01F 27/323

* cited by examiner

*Primary Examiner* — Tuan H Nguyen

(57) ABSTRACT

A method for applying AOI to copper coils thinned by laser etching includes placing a half-finished product under a scanning unit; scanning the half-finished product to generate an image; sending the image to an image analysis unit which is activated to analyze the image, identify cutting boundaries of the half-finished product, compare the cutting boundaries with an original processing path file, and identify defects of the half-finished product; activating the image analysis unit to find points around the half-finished product; activating the image analysis unit to simulate an optimum path; activating the image analysis unit to convert the optimum path into an optimum processing path file; activating the image analysis unit to send the optimum processing path file to a program unit; conveying the half-finished product to dispose under a laser processing unit; and activating the program unit to instruct the laser processing unit to process the half-finished product.

4 Claims, 8 Drawing Sheets

METHOD FOR APPLYING AUTOMATIC OPTICAL INSPECTION TO COPPER COILS THINNED BY LASER ETCHING AND APPARATUS THEREFOR

BACKGROUND OF THE INVENTION

1. Field of the Invention

The invention relates to copper coils thinned by laser etching and more particularly to a method for applying automatic optical inspection (AOI) to copper coils thinned by laser etching and apparatus therefor.

2. Description of Related Art

Conventionally, laser processing comprises the steps of providing a laser processing path file, storing the laser processing path file in a program unit, and activating a laser processing unit to perform laser processing on half-finished products based on the laser processing path file.

It is typical that the half-finished products may have defects including expansion, contraction, deformation, and protrusions. However, the laser processing unit still performs laser processing on the half-finished products based on the laser processing path file. Thus, the defected portions of the cutting grooves of the half-finished products are not cut by the laser processing unit. This increases the times of laser cutting failure. As a result, the finished products have a low yield rate.

Thus, the need for improvement still exists.

SUMMARY OF THE INVENTION

It is therefore one object of the invention to provide a method for applying automatic optical inspection to copper coils thinned by laser etching comprising placing a half-finished product under a scanning unit; activating the scanning unit to optically scan the half-finished product to generate a digital image of the half-finished product; sending the digital image to an image analysis unit; activating the image analysis unit to analyze the digital image, identify cutting boundaries of the half-finished product, compare the cutting boundaries of the half-finished product with an original laser processing path file, and identify defects of the half-finished product based on the comparison; activating the image analysis unit to find points around the half-finished product and distances; activating the image analysis unit to simulate an optimum path with respect to the defects of the half-finished product based on the points around the half-finished product and the distances; activating the image analysis unit to convert the optimum path into an optimum processing path file; activating the image analysis unit to send the optimum processing path file to a program unit; conveying the half-finished product to a predetermined position under a laser processing unit; and activating the program unit to instruct the laser processing unit to process the half-finished product based on the optimum processing path file, thereby producing a finished product.

The above and other objects, features and advantages of the invention will become apparent from the following detailed description taken with the accompanying drawings.

DETAILED DESCRIPTION OF THE INVENTION

Figure 1:
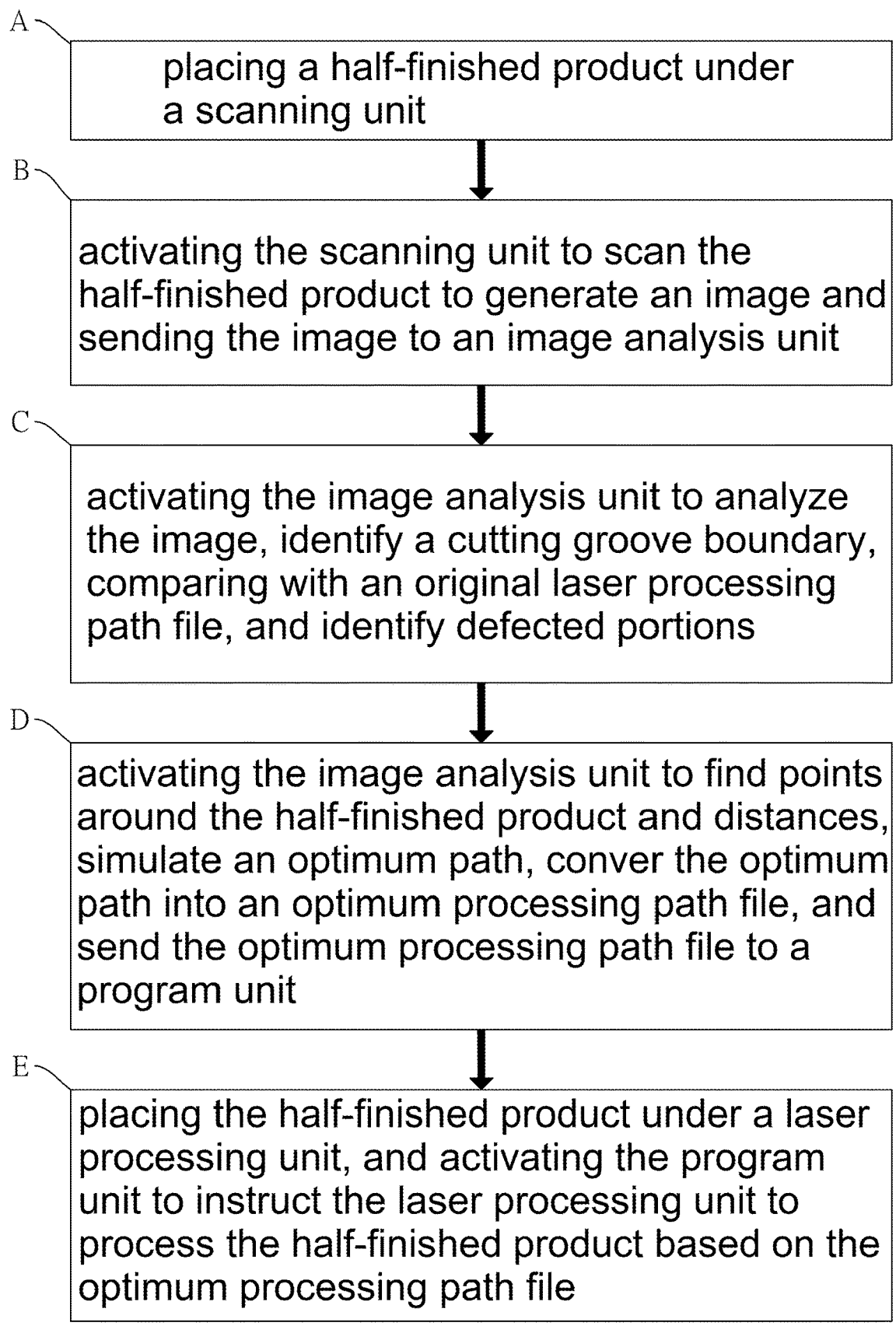
FIG. 1 is a flow chart of a method for applying AOI to copper coils thinned by laser etching according to the invention.
Figure 2:
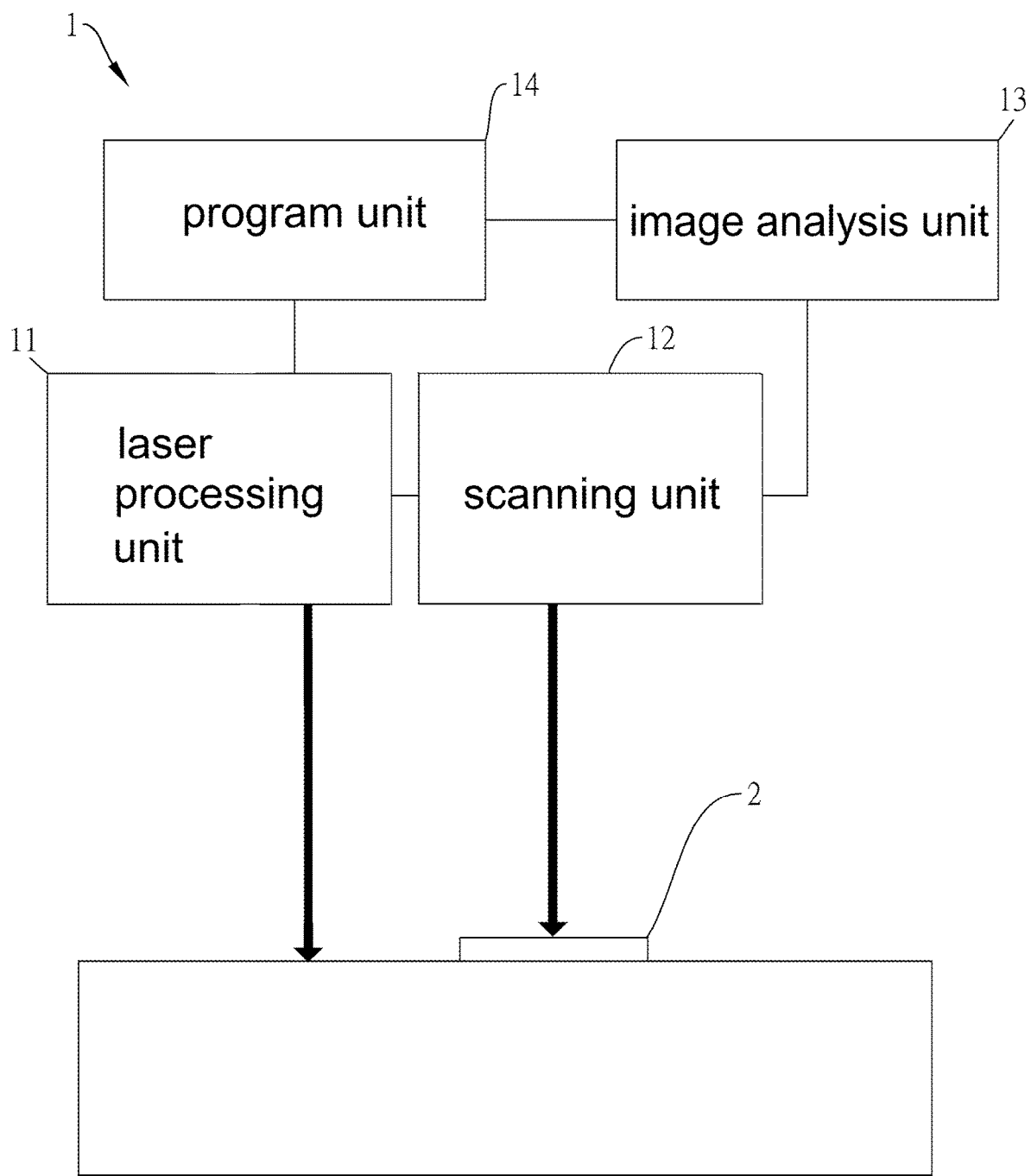
FIG. 2 is a block diagram of an apparatus for applying AOI to copper coils thinned by laser etching according to the invention.

Referring to FIG. 1, a flow chart of a method for applying AOI to copper coils thinned by laser etching in accordance with the invention is illustrated. Referring to FIG. 2, an apparatus 1 for applying AOI to copper coils thinned by laser etching in accordance with the invention comprises a laser processing unit 11, a scanning unit 12, an image analysis unit 13, and a program unit 14.

As illustrated in FIG. 1 in conjunction with FIG. 2, the method comprises the following steps:

Step A: placing a half-finished product 2 under the scanning unit 12.

Step B: activating the scanning unit 12 to optically scan the half-finished product 2 to generate a digital image of the half-finished product 2, and sending the digital image to the image analysis unit 13.

Step C: activating the image analysis unit 13 to analyze the digital image for finding expansion, contraction, deformation, and protrusions of the half-finished product 2, identifying cutting boundaries of the half-finished product 2 by finding black and white contrast ratio of the digital image, and comparing the cutting boundaries of the half-finished product 2 with an original laser processing path file to identify defects including expansion, contraction, deformation, and protrusions of the half-finished product 2.

Step D: activating the image analysis unit 13 to find points around the half-finished product 2 and distances which are used to simulate an optimum path with respect to the defects of the half-finished product 2, converting the optimum path into an optimum processing path file, and sending the optimum processing path file to the program unit 14.

Step E: conveying the half-finished product 2 to a predetermined position under the laser processing unit 11, and activating the program unit 14 to instruct the laser processing unit 11 to process the half-finished product 2 based on the optimum processing path file, thereby producing a finished product.

As shown in FIG. 2, the laser processing unit 11 processes the half-finished product 2 with laser based on processing path instructions issued by the program unit 14.

The scanning unit 12 is electrically connected to the laser processing unit 11 and is adapted to generate a digital image of cutting boundaries of the half-finished product 2, and send the digital image to the image analysis unit 13.

The image analysis unit 13 is electrically connected to the scanning unit 12 and is adapted to receive the digital image from the scanning unit 12. Further, the image analysis unit 13 identifies cutting boundaries of the half-finished product 2 by finding black and white contrast ratio of the digital image, and compares the cutting boundaries of the half-finished product 2 with an original laser processing path file to identify defects including expansion, contraction, deformation, and protrusions of the half-finished product 2. Furthermore, the image analysis unit 13 finds points around the half-finished product 2 and distances which are used to simulate an optimum path with respect to the defects of the half-finished product 2, converts the optimum path into an optimum processing path file, and sends the optimum processing path file to the program unit 14.

The program unit 14 is electrically connected to the image analysis unit 13 and the laser processing unit 11 respectively and further instructs the laser processing unit 11 to process the half-finished product 2 based on the optimum processing path file, thereby producing a finished product.

Preferably, the scanning unit 12 is a charge-coupled device (CCD) camera.

Preferably, the half-finished product 2 is thin copper coils. More preferably, the half-finished product 2 is thin copper coils for wireless charge and has a size less than 40 mm and a thickness less than 300 μm.

Figure 3A:
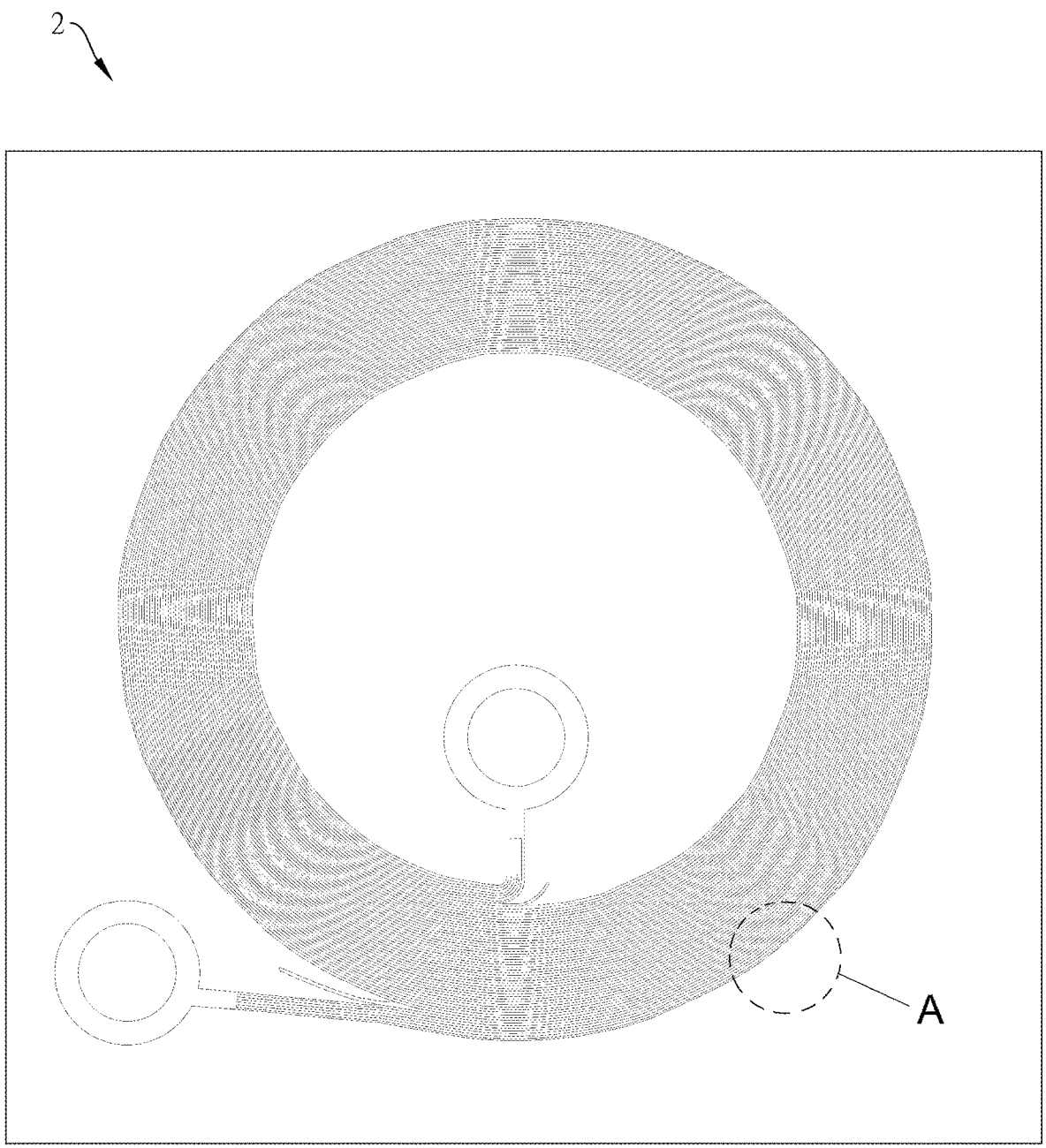
FIG. 3A is a plan view of a finished product of the invention.
Figure 3B:
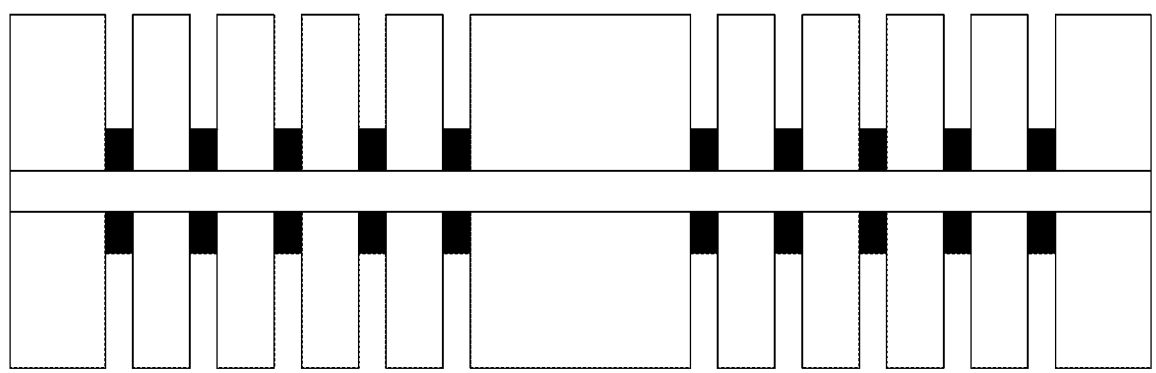
FIG. 3B is a longitudinal sectional view of the finished product.
Figure 4:
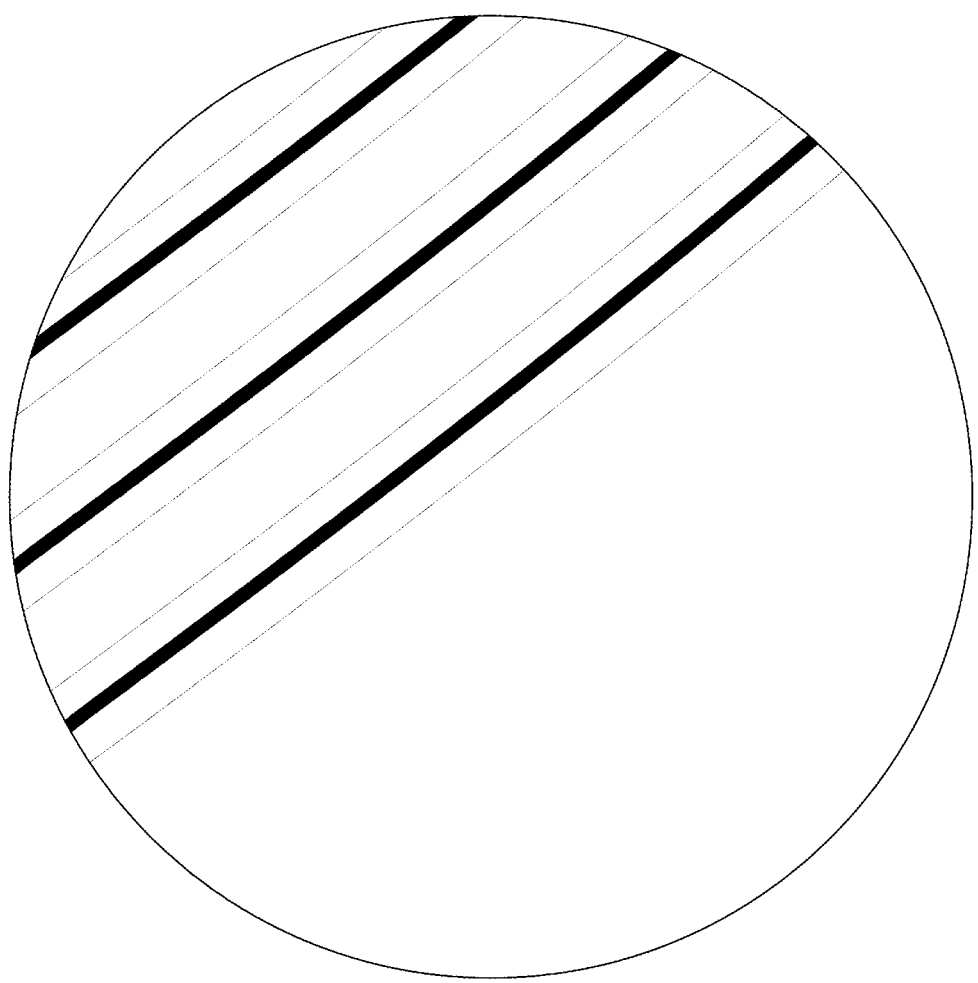
FIG. 4 is an enlarged view of the area in circle A of FIG. 3A for showing the original laser processing path of the invention.

Referring to FIG. 3A, it shows a finished product of the invention. Referring to FIG. 3B, it is a longitudinal sectional view of the finished product. Referring to FIG. 4, it is an enlarged view of the area in circle A of FIG. 3A for showing the original laser processing path of the invention.

In the invention, a process of spirally cutting and processing thin copper coils (e.g., the half-finished product 2) is taken as an exemplary example. Initially, light is emitted by laser based on the original processing path file and the light impinges on spiral cutting grooves for processing. In FIG. 3B, the black rectangles are portions to be cut by the laser processing unit 11. In FIG. 4, the black lines are the original laser processing path.

However, the spiral cutting grooves of the half-finished product 2 may have defects including expansion, contraction and deformation due to irregularities in the manufacturing process. If the spiral cutting grooves of the half-finished product 2 have defects and the laser processing unit 11 employs laser to cut laser half-finished product 2 based on the original processing path file, it is possible that the correct spiral cutting grooves are not cut. As a result, the laser cutting of the half-finished product 2 fails and the yield rate increases greatly. Advantageously, the method for applying AOI to copper coils thinned by laser etching and apparatus therefor are provided by the invention to eliminate conventional drawbacks including incorrect laser cutting of the defected portions of the half-finished product 2.

Figure 5:
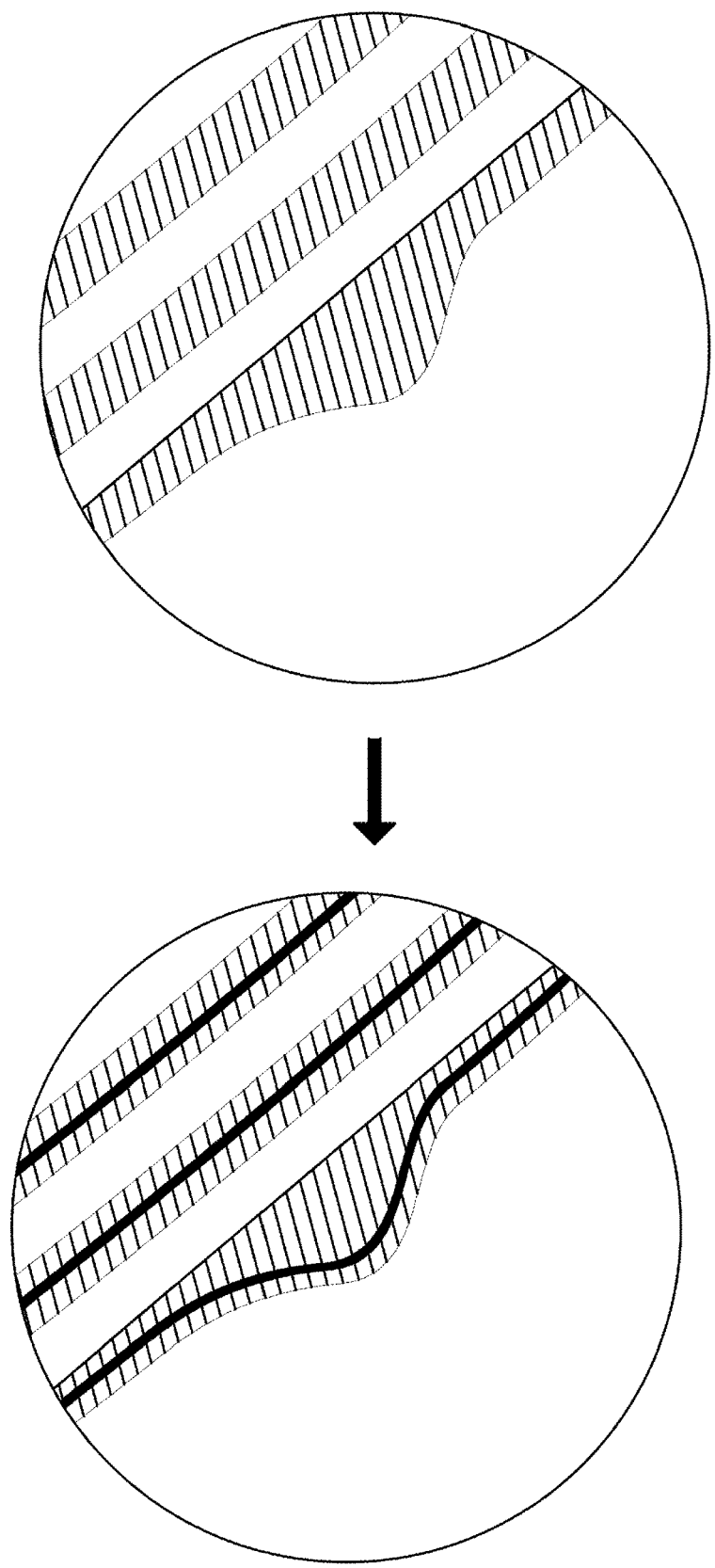
FIG. 5 is an enlarged view showing a first configuration of defected portions of the half-finished product along a processing path being optimized by laser according to a preferred embodiment of the invention.
Figure 6:
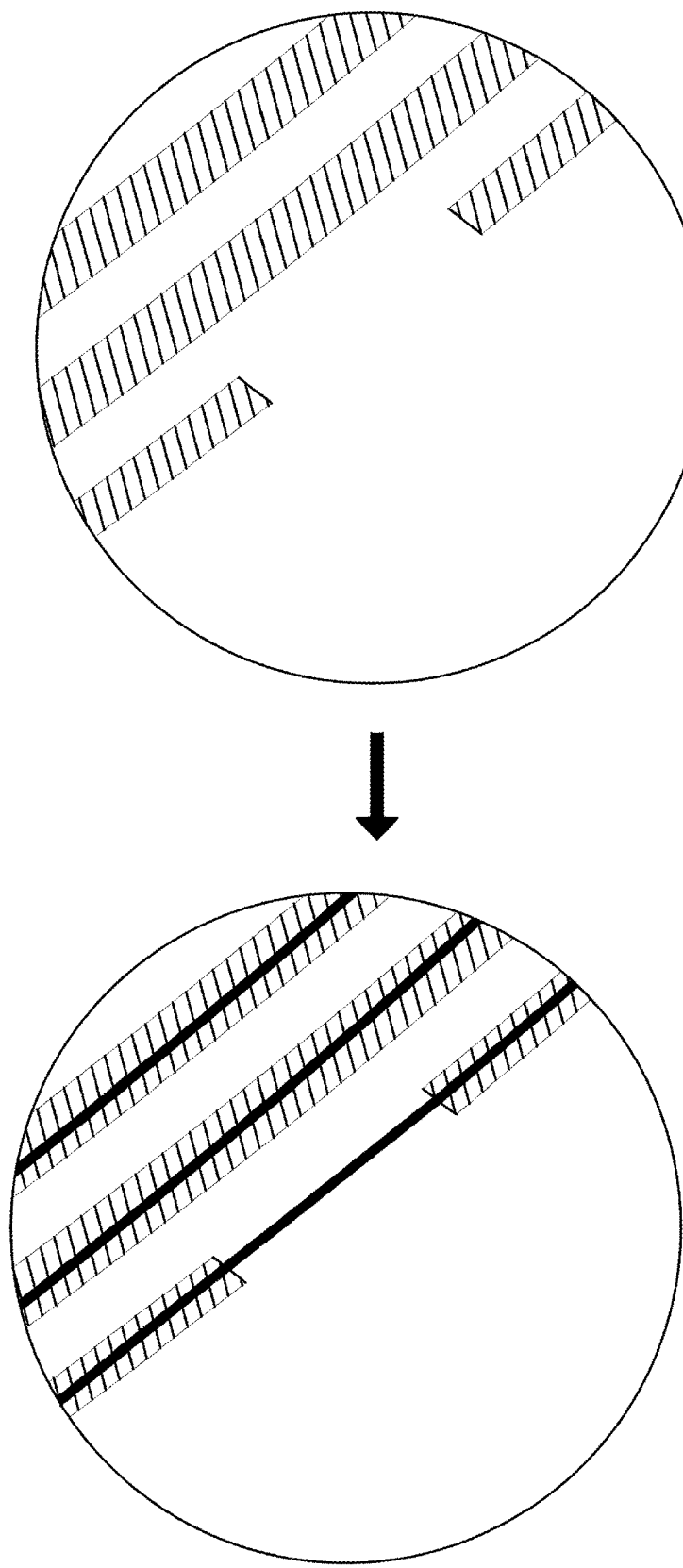
FIG. 6 is an enlarged view showing a second configuration of defected portions of the half-finished product along a processing path being optimized by laser according to the preferred embodiment of the invention.
Figure 7:
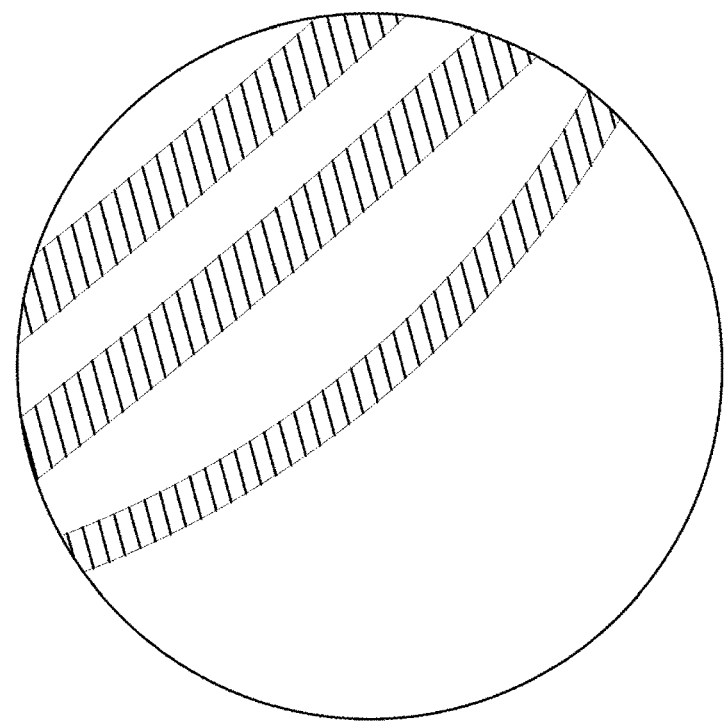
FIG. 7 is an enlarged view showing a third configuration of defected portions of the half-finished product along a processing path being optimized by laser according to the preferred embodiment of the invention.
Figure 7:
Figure 7:
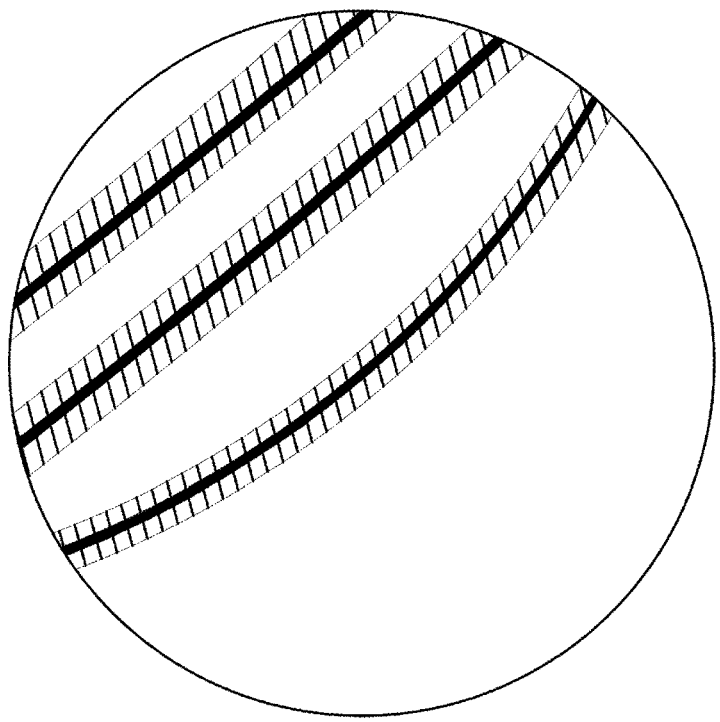

Referring to FIG. 5, it is an enlarged view showing a first configuration of defected portions of the half-finished product 2 along a processing path being optimized by laser according to a preferred embodiment of the invention. Referring to FIG. 6, it is an enlarged view showing a second configuration of defected portions of the half-finished product 2 along a processing path being optimized by laser according to the preferred embodiment of the invention. Referring to FIG. 7, it is an enlarged view showing a third configuration of defected portions of the half-finished product 2 along a processing path being optimized by laser according to the preferred embodiment of the invention.

In FIG. 5, a first configuration (e.g., a protrusion) of defected portions of the half-finished product 2 along a processing path is optimized. In FIG. 6, a second configuration (e.g., a broken line) of defected portions of the half-finished product 2 along a processing path is optimized. In FIG. 7, a third configuration (e.g., deformation) of defected portions of the half-finished product 2 along a processing path is optimized. In each of FIGS. 5, 6 and 7, after the defected portions of the half-finished product 2 has been scanned by the scanning unit 12 and analyzed by the image analysis unit 13, diagonal lines are used to represent the defected portions of the half-finished product 2; and black lines are used to represent new processing paths after being optimized by simulation. The analysis of the defected portions of the half-finished product 2 done by the image analysis unit 13 comprises identifying which configuration of the defected portions of the half-finished product 2 belongs to (i.e., represented by the diagonal lines of FIGS. 5, 6 and 7) by finding black and white contrast ratio of the digital image generated by the scanning unit 12. After the image analysis unit 13 has identified the defected portions of the half-finished product 2 to be a protrusion (see the diagonal lines in FIG. 5) or a deformation (see the diagonal lines in FIG. 7), the image analysis unit 13 further calculates an optimum processing path based on the identified defected portions, and furthermore simulates processing paths with respect to the protrusion (see the black lines in FIG. 5) or with respect to the deformation (see the black lines in FIG. 7).

In detail, with respect to the defected portions of the half-finished product 2 to be a protrusion (or a deformation), the image analysis unit 13 simulates a midpoint of a cutting groove boundary as an improved new processing path, simulates differences between the protrusion and the original processing path, and simulates a smooth curve having the same slope as the protrusion. The image analysis unit 13 further converts the improved new processing path into an updated processing path file and sends same to the program unit 14. Thus, the laser processing unit 11 may correctly cut the cutting groove of the half-finished product 2 in the cutting step based on the updated processing path file. To the contrary, the laser processing unit 11 may not correctly cut the cutting groove of the half-finished product 2 if the cutting is based on the original processing path file. Advantageously, the image analysis unit 13 of the invention makes adjustments prior to laser cutting, thereby avoiding incorrect cutting of the cutting groove of the half-finished product 2 and further increasing the yield rate.

After the image analysis unit 13 has identified the defected portions of the half-finished product 2 to be a broken line (see the diagonal lines in FIG. 6) by finding black and white contrast ratio of the digital image generated by the scanning unit 12, the image analysis unit 13 further simulates a midpoint of a cutting groove boundary as an improved new processing path, simulates differences between the new processing path and the original processing path, and simulates slope differences by comparing the original processing path with the processing path of the defected portions of the half-finished product 2, simulates a smooth curve proximate the defected portions of the half-finished product 2, and calculates two end positions of the broken line, a distance between the two end positions of the broken line, and a slope of the smooth curve. As such, new processing paths (see the black lines in FIG. 6) with respect to the broken line is simulated by the image analysis unit 13. The image analysis unit 13 further converts the new processing paths into an updated processing path file and sends same to the program unit 14. Thus, the laser processing unit 11 may correctly cut the cutting groove of the half-finished product 2 in the cutting step based on the updated processing path file. To the contrary, the laser processing unit 11 may not correctly cut the cutting groove of the half-finished product 2 if the cutting is based on the original processing path file. Advantageously, the image analysis unit 13 of the invention makes adjustments prior to laser cutting, thereby avoiding incorrect cutting of the cutting groove of the half-finished product 2 and increasing the yield rate.

Figure 8:
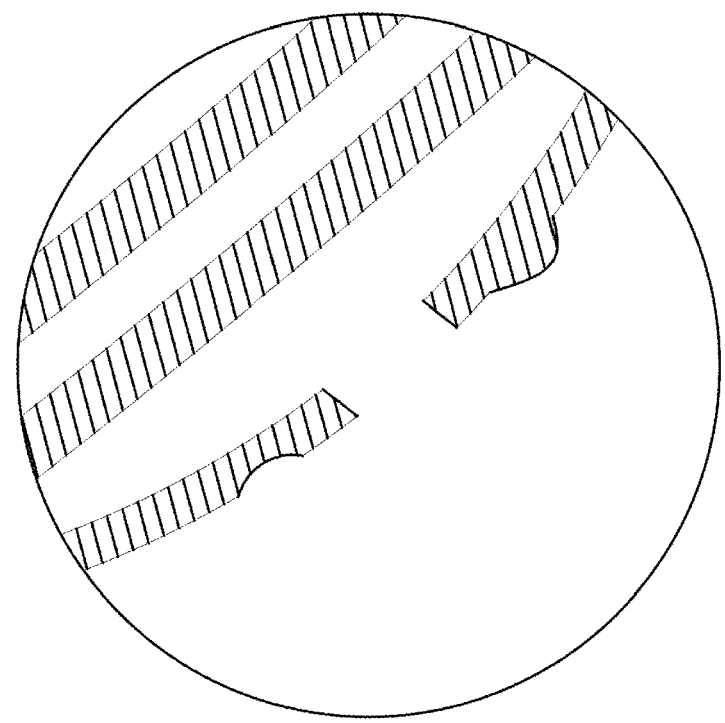
FIG. 8 is an enlarged view showing the first, second and third configurations of defected portions of the half-finished product along a processing path being optimized by laser according to the preferred embodiment of the invention.
Figure 8:
Figure 8:
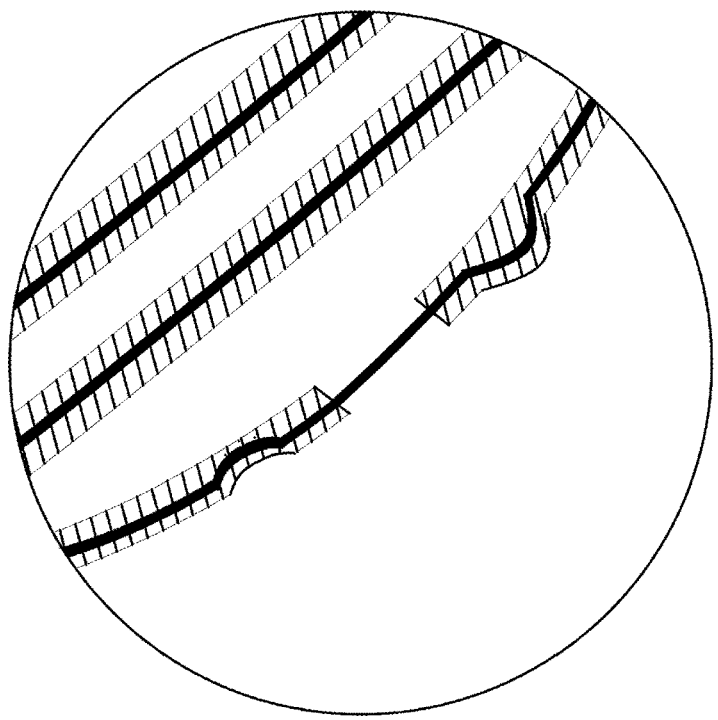

Referring to FIG. 8, it is an enlarged view showing the first, second and third configurations of the defected portions of the half-finished product 2 along a processing path being optimized by laser according to the preferred embodiment of the invention in which the first, second and third configurations (see the diagonal lines) of the defected portions of the half-finished product 2 are analyzed and identified by the image analysis unit 13. The first, second and third configurations of the defected portions of the half-finished product 2 include a protrusion, a deformation and a broken line. Similarly, the image analysis unit 13 finds black and white contrast ratio of the digital image generated by the scanning unit 12. After the image analysis unit 13 has identified the defected portions of the half-finished product 2 to be one of the first, second and third configurations, the image analysis unit 13 further a midpoint of a cutting groove boundary as an improved new processing path, simulates slope differences by comparing the original processing path with the processing path of the defected portions of the half-finished product 2, simulates a smooth curve proximate the defected portions of the half-finished product 2, and calculates two end positions of the broken line, a distance between the two end positions of the broken line, and a slope of the smooth curve. As such, new processing paths (see the black lines in FIG. 8) with respect to the defected portions of the half-finished product 2 is simulated by the image analysis unit 13. The image analysis unit 13 further converts the new processing paths into an updated processing path file and sends same to the program unit 14. Thus, the laser processing unit 11 may correctly cut the cutting groove of the half-finished product 2 in the cutting step based on the updated processing path file. To the contrary, the laser processing unit 11 may not correctly cut the cutting groove of the half-finished product 2 if the cutting is based on the original processing path file. Advantageously, the image analysis unit 13 of the invention makes adjustments prior to laser cutting, thereby avoiding incorrect cutting of the cutting groove of the half-finished product 2 and further increasing the yield rate.

The method for applying AOI to copper coils thinned by laser etching and the apparatus therefor of the invention has the following advantages and benefits in comparison with the conventional art:

It can quickly find locations of the defected portions of the half-finished product. With the help of the scanning unit and the image analysis unit, it can quickly find locations of the defected portions of the half-finished product in the laser processing and increases the yield rate.

It can provide an automatic optimum path. The image analysis unit automatically simulates the defected portions of the half-finished product as an optimum processing path, converts same into a new processing path file, and sends the new processing path file to the program unit. Thus, the laser processing unit may process the defected portions of the half-finished product based on the new processing path file.

It can decrease defect rate. Defects of the half-finished product are decreased greatly because the laser processing unit processes the defected portions of the half-finished product based on the new processing path file.

While the invention has been described in terms of preferred embodiments, those skilled in the art will recognize that the invention can be practiced with modifications within the spirit and scope of the appended claims.

What is claimed is:

1. A method for applying automatic optical inspection (AOI) to copper coils thinned by laser etching, comprising the steps of:
   (a) placing a half-finished product under a scanning unit;
   (b) activating the scanning unit to optically scan the half-finished product to generate a digital image of the half-finished product;
   (c) sending the digital image to an image analysis unit;
   (d) activating the image analysis unit to analyze the digital image, identify cutting boundaries of the half-finished product, compare the cutting boundaries of the half-finished product with an original laser processing path file, and identify defects of the half-finished product based on the comparison;
   (e) activating the image analysis unit to find points around the half-finished product and distances;
   (f) activating the image analysis unit to simulate an optimum path with respect to the defects of the half-finished product based on the points around the half-finished product and the distances;
   (g) activating the image analysis unit to convert the optimum path into an optimum processing path file;
   (h) activating the image analysis unit to send the optimum processing path file to a program unit;
   (i) conveying the half-finished product to a predetermined position under a laser processing unit; and
   (j) activating the program unit to instruct the laser processing unit to process the half-finished product based on the optimum processing path file, thereby producing a finished product.

2. The method of claim 1, wherein the half-finished product is thin copper coils.

3. The method of claim 2, wherein the half-finished product is thin copper coils for wireless charge.

4. The method of claim 3, wherein the thin copper coils for wireless charge and have a size less than 40 mm and a thickness less than 300 µm.

* * * * *